(12) United States Patent
Lohmeier et al.

(10) Patent No.: US 7,973,701 B2
(45) Date of Patent: Jul. 5, 2011

(54) AUTOMOTIVE RADAR SENSOR BLOCKAGE DETECTION SYSTEM AND RELATED TECHNIQUES

(75) Inventors: Stephen P. Lohmeier, Westford, MA (US); Nguyen D. Nguyen, Dorchester, MA (US)

(73) Assignee: Valeo Radar Systems, Inc., Hudson, NH (US)

( * ) Notice: Subject to any disclaimer, the term of this patent is extended or adjusted under 35 U.S.C. 154(b) by 45 days.

(21) Appl. No.: 12/414,227

(22) Filed: Mar. 30, 2009

(65) Prior Publication Data

US 2009/0243912 A1 Oct. 1, 2009

Related U.S. Application Data

(60) Provisional application No. 61/040,948, filed on Mar. 31, 2008.

(51) Int. Cl.
*G01S 13/00* (2006.01)
(52) U.S. Cl. .......... 342/89; 342/104; 342/118; 342/147; 342/175
(58) Field of Classification Search ............... 342/70
See application file for complete search history.

(56) References Cited

U.S. PATENT DOCUMENTS

| | | |
|---|---|---|
| 3,697,985 A | 10/1972 | Faris et al. |
| 3,898,652 A | 8/1975 | Rashid |
| 3,921,749 A | 11/1975 | Kawada |
| 3,935,559 A | 1/1976 | Straffon et al. |
| 3,940,696 A | 2/1976 | Nagy |
| 3,974,501 A | 8/1976 | Ritzie |
| 3,978,481 A | 8/1976 | Angwin et al. |
| 4,003,049 A | 1/1977 | Sterzur et al. |
| 4,008,473 A | 2/1977 | Hinachi et al. |
| 4,008,475 A | 2/1977 | Johnson |
| 4,035,797 A | 7/1977 | Nagy |
| 4,079,377 A | 3/1978 | zur Heiden et al. |
| 4,143,370 A | 3/1979 | Yamanaka et al. |
| 4,217,582 A | 8/1980 | Endō et al. |

(Continued)

FOREIGN PATENT DOCUMENTS

DE 196 32 889 A1 2/1998

(Continued)

OTHER PUBLICATIONS

PCT Search Report of the ISA for PCT/US2009/038755, dated Aug. 13, 2009.

(Continued)

*Primary Examiner* — Thomas H Tarcza
*Assistant Examiner* — Timothy A Brainard
(74) *Attorney, Agent, or Firm* — Daly, Crowley, Mofford & Durkee, LLP

(57) ABSTRACT

A blockage detection system and method for use in a sensor such as a side object detection (SOD) sensor in an automotive radar system is described. The sensor emits signals and receives return signals (i.e. reflected signals) from a passing object. If the passing object is within a virtual detection zone, the sensor uses the information from the passing object to determine if a blockage condition exists in the sensor. The technique utilizes statistics related to the passing object to determine whether a blockage condition exists within the sensor. In one embodiment, a SOD sensor mounted in a first vehicle uses information from a second passing vehicle (e.g. radar return information) to determine whether a blockage condition exists within the SOD sensor itself.

4 Claims, 9 Drawing Sheets

U.S. PATENT DOCUMENTS

| | | |
|---|---|---|
| 4,308,536 A | 12/1981 | Sims, Jr. et al. |
| 4,346,774 A | 8/1982 | Hirota et al. |
| 4,348,675 A | 9/1982 | Senzaki et al. |
| 4,349,823 A | 9/1982 | Tagami et al. |
| 4,409,899 A | 10/1983 | Owen et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,965,605 A | 10/1990 | Chang et al. |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,243,358 A | 9/1993 | Sanford et al. |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,097 A | 6/1994 | Zhang et al. |
| 5,332,057 A | 7/1994 | Butsuen et al. |
| 5,339,075 A | 8/1994 | Abst et al. |
| 5,341,144 A | 8/1994 | Stove |
| 5,345,243 A | 9/1994 | Levis |
| 5,351,044 A | 9/1994 | Mathur et al. |
| 5,369,591 A | 11/1994 | Broxmeyer |
| 5,390,118 A | 2/1995 | Margolis et al. |
| 5,400,864 A | 3/1995 | Winner et al. |
| 5,414,643 A | 5/1995 | Blackman et al. |
| 5,428,359 A | 6/1995 | Yoneyama et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,512,901 A | 4/1996 | Chen et al. |
| 5,521,579 A | 5/1996 | Bernhard |
| 5,525,995 A | 6/1996 | Benner |
| 5,572,428 A | 11/1996 | Ishida et al. |
| 5,583,495 A | 12/1996 | Ben Lulu |
| 5,587,908 A | 12/1996 | Kajiwara |
| 5,627,510 A | 5/1997 | Yuan |
| 5,627,511 A | 5/1997 | Takagi et al. |
| 5,654,715 A | 8/1997 | Hayashikura et al. |
| 5,670,963 A | 9/1997 | Kubota et al. |
| 5,678,650 A | 10/1997 | Ishihara et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,806,019 A | 9/1998 | Ishiyama |
| 5,808,561 A | 9/1998 | Kinoshita et al. |
| 5,808,728 A | 9/1998 | Uehara |
| 5,818,355 A | 10/1998 | Shirai et al. |
| 5,818,383 A | 10/1998 | Stockburger et al. |
| 5,839,534 A | 11/1998 | Chakraborty et al. |
| 5,841,393 A | 11/1998 | Saito et al. |
| 5,886,671 A | 3/1999 | Riemer et al. |
| 5,905,472 A | 5/1999 | Wolfson et al. |
| 5,923,280 A | 7/1999 | Farmer |
| 5,929,802 A | 7/1999 | Russell et al. |
| 5,938,714 A | 8/1999 | Satonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 6,018,308 A | 1/2000 | Shirai |
| 6,026,353 A | 2/2000 | Winner |
| 6,028,548 A | 2/2000 | Farner |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,097,331 A | 8/2000 | Matsugatani et al. |
| 6,107,956 A | 8/2000 | Russell et al. |
| 6,124,823 A | 9/2000 | Tokoro |
| 6,127,965 A | 10/2000 | McDade et al. |
| 6,147,637 A | 11/2000 | Morikawa et al. |
| 6,147,638 A | 11/2000 | Rohling et al. |
| 6,154,168 A | 11/2000 | Egawa et al. |
| 6,154,176 A | 11/2000 | Fathy et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 | 7/2001 | Gunderson et al. |
| 6,269,298 B1 | 7/2001 | Seto |
| 6,278,400 B1 | 8/2001 | Cassen et al. |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,366,235 B1 | 4/2002 | Mayer et al. |
| 6,469,659 B1 | 10/2002 | Lajiness et al. |
| 6,611,227 B1 | 8/2003 | Nebiyeloul-Kiffle et al. |
| 2002/0044082 A1 | 4/2002 | Woodington et al. |
| 2002/0049539 A1 | 4/2002 | Russell et al. |
| 2002/0067287 A1 | 6/2002 | Delcheccolo et al. |
| 2002/0163463 A1* | 11/2002 | Lajiness et al. ............ 342/70 |
| 2004/0257556 A1* | 12/2004 | Samukawa et al. ....... 356/4.01 |
| 2006/0058035 A1* | 3/2006 | Tsuruno ..................... 455/454 |

FOREIGN PATENT DOCUMENTS

| | | |
|---|---|---|
| DE | 195 23 693 A1 | 5/1998 |
| DE | 199 45 268 A1 | 3/2001 |
| DE | 199 45 250 A1 | 4/2001 |
| DE | 199 48 252 A1 | 6/2001 |
| EP | 0 649 776 A2 | 4/1995 |
| EP | 0 887 658 A1 | 12/1998 |
| EP | 1 074 853 A2 | 2/2001 |
| EP | 1 074 853 A3 | 2/2001 |
| EP | 1 094 336 A2 | 4/2001 |
| EP | 1 094 336 A3 | 4/2001 |
| FR | 2 754 604 | 4/1998 |
| GB | 2 267 401 A | 12/1993 |
| JP | 07-081604 | 3/1995 |
| WO | WO 90/02985 | 3/1990 |

OTHER PUBLICATIONS

PCT Written Opinion of the ISA for PCT/US2009/038755, dated Aug. 13, 2009.
PCT Search Report of the ISA for PCT/US 03/13176 dated Aug. 20, 2003.
EPO Examination Report dated Aug. 18, 2005 for EP App. No. 03 724 299.7.
Response to Examination Report dated Aug. 18, 2005 for EP App. No. 03 724 299.7 dated Feb. 28, 2006.
EPO Examination Report dated Mar. 13, 2006 for EP App. No. 03 724 299.7.
Response to EPO Examination Reported dated Mar. 13, 2006 for EP App. No. 03 724 299.7 dated Sep. 11, 2006.
Summons to Attend Oral Proceedings dated Oct. 16, 2006 for EP App. No. 03 724 299.7.
Reply to Invitation to Oral Proceedings dated Oct. 16, 2006 for EP App. No. 03 724 299.7 dated Jan. 5, 2007.
Reply to EPO Form 2036 dated Jan. 22, 2007 for EP App. No. 03 724 299.7.
EPO Notice of Intent to Grant dated Feb. 16, 2007 for EP App. No. 03 724 299.7.
International Preliminary Report on Patentability for PCT/US2009/038755 dated Oct. 14, 2010.
Image File Wrapper downloaded on Nov. 12, 2010 for U.S. Appl. No. 5,959,570, filed Nov. 21, 1997.
Image File Wrapper downloaded on Nov. 12, 2010 for U.S. Appl. No. 6,611,227, filed Aug. 8, 2002.

* cited by examiner

AUTOMOTIVE RADAR SENSOR BLOCKAGE DETECTION SYSTEM AND RELATED TECHNIQUES

RELATED APPLICATIONS

This application claims the benefit, under 35 U.S.C. §119 (e), of U.S. Provisional Application No. 61/040,948 filed Mar. 31, 2008 which application is hereby incorporated herein by reference in its entirety.

FIELD OF THE INVENTION

The structures and techniques described herein relate to radars and more particularly to structure and techniques for detecting a blockage in a radar such as an automotive radar.

BACKGROUND OF THE INVENTION

As is known in the art, the existence of foreign matter or objects on a radar such as an automotive radar sensor of the type described in U.S. Pat. No. 5,959,570, for example, can impact the accuracy and reliability of the radar. For example, the foreign matter or objects may undesirably block one or more portions of the radar sensor transmit and/or receive antennas and in particular may block portions of the RF energy propagating to and from the transmit and receive antennas of the radar sensor.

Such blockage may, for example, be the result of an accumulation, over a period of time, of foreign matter or objects in the region of an antenna aperture. Such foreign matter may be caused for example by environmental conditions such as temperature, humidity, ice, rain and the like. Such blockage can degrade, or in extreme cases even prevent, proper operation of the automotive radar sensor. If the foreign matter accumulates over time, there is a corresponding gradual decrease in sensor system performance over time. Since the accumulation is gradual, it is sometimes relatively difficult to detect the existence of antenna blockage due to the gradual accumulation of foreign matter and corresponding gradual decrease in radar sensor performance.

It would, therefore, be desirable to provide a radar which is capable of detecting blockage. It would also be desirable to provide a radar which is capable of detecting blockage due to the accumulation of foreign matter, such as mud, ice, snow or the like, on or proximate a radar radome. It would further be desirable to provide a radar which detects blockage and which notifies a system user of the existence of such blockage. It would be further desirable to provide an automotive radar sensor capable of detecting blockage. It would also be desirable to provide an automotive radar sensor which is capable of detecting blockage due to the accumulation of foreign matter, such as mud, ice, snow or the like, on the vehicle in or proximate that area of the vehicle in which the automotive sensor is mounted. It would further be desirable to provide an automotive radar sensor which detects blockage and which notifies a system user of the existence of such blockage.

SUMMARY OF THE INVENTION

In accordance with the techniques and concepts described herein, a blockage detection process includes (a) detecting a target within a virtual detection zone, (b) while the target is within the virtual detection zone, accumulating target-related information, and (c) based upon the information accumulated in (b), determining if a blind spot alert signal was missed. The process further includes (d) in response to a decision being made that a blind spot alert signal was missed, recording a time of the miss and (e) based upon information for each recorded miss, determining whether a blockage condition exists. With this particular arrangement, a process for detecting blockage in a sensor is provided. In one embodiment, once a decision is made that a blockage condition exists within the sensor, the process further includes providing an indication that a blockage condition exists. If the sensor is provided as an automotive radar sensor, then an indication that a blockage condition exists may be given to an operator of the vehicle on which the automotive radar sensor is disposed by a visual, audio or mechanical technique. The information related to the target may correspond to statistics, including, but not limited to one or more of target range history, range of closest approach, point of closest approach, angle, angle history, speed, time spent by a target in a virtual detection zone, number of total detections, raw radar detection count and detection density as a function of range and/or angle.

In accordance with a further aspect, a system for detecting blockage includes a transmit antenna, a transmitter coupled to provide a transmit signal to the transmit antenna, a receive antenna, a receiver coupled to receive signals from said receive antenna and a blockage detection processor configures to identify objects in a virtual detection zone and to determine if a blockage condition exists based upon information on recorded misses.

In accordance with a still further aspect, a method for determining a blockage condition in an automotive radar side object detection system includes establishing a virtual detection zone, emitting signals from the automotive radar side object detection system, and receiving, in the automotive radar side object detection system, a plurality of return signals from a target located in the virtual detection zone. The method further includes processing the plurality of return signals from the target located in the virtual detection zone to determine if a blockage condition exists. With this particular arrangement, a process which uses information from a passing object to determine if a blockage condition in a sensor is provided. For example, a SOD sensor mounted in a first vehicle uses information from a second passing vehicle (e.g. radar return information) to determine whether the SOD sensor itself has a blockage. Stated differently, the technique utilizes statistics related to passing objects (e.g. vehicles) to determine the existence of a blockage.

In one embodiment, once a blockage alert signal is generated if, at a later time, it does not appear that the blockage condition still exists (e.g. the system does not generate any new missed alert signals or the system generates one or more detection signals which indicate that the system is working), then the blockage alert signal is allowed to expire (i.e. a determination is made that system is no longer blocked). However, the system continues to monitor for blockage and if the system continues to look like a blockage condition exists (e.g. the system does generate new missed alert signals), then blockage alert signal does not expire.

BRIEF DESCRIPTION OF THE DRAWINGS

The foregoing features of this invention, as well as the invention itself, may be more fully understood from the following description of the drawings in which.

DETAILED DESCRIPTION OF THE PREFERRED EMBODIMENTS

Described herein is an approach for generating a missed alert signal and in particular, a blockage alert signal in a sensor such as a side object detection (SOD) sensor such as that described in U.S. Pat. No. 6,784,828 assigned to the assignee of the present application or a forward looking sensor (FLS) such as that described in U.S. Pat. No. 5,929,802 also assigned to the assignee of the present application. While the techniques described herein are described as used in a vehicle radar system (a/k/a an automotive radar system), it should be appreciated that the techniques described herein may be used in any fixed (i.e. stationary) or mobile sensor or detection system. Hence, the techniques described herein are not dependent upon any specific hardware configuration. Rather, as will be seen below, the technique can operate with input data from any sensor or detection system rather than being for operation solely with a radar system. Furthermore, reference is sometimes made herein below to a particular type of automotive radar system referred to as a side-object detection (SOD) system. It should be appreciated that such references are made merely to promote clarity in the description of the concepts described herein and such references should not be construed as limiting the structures and techniques described herein to use solely with a SOD system or solely with an automotive radar system. Rather, it should be appreciated that the structures and techniques described herein may be used with any type of radar, sensor or other detection system.

Figure 1:
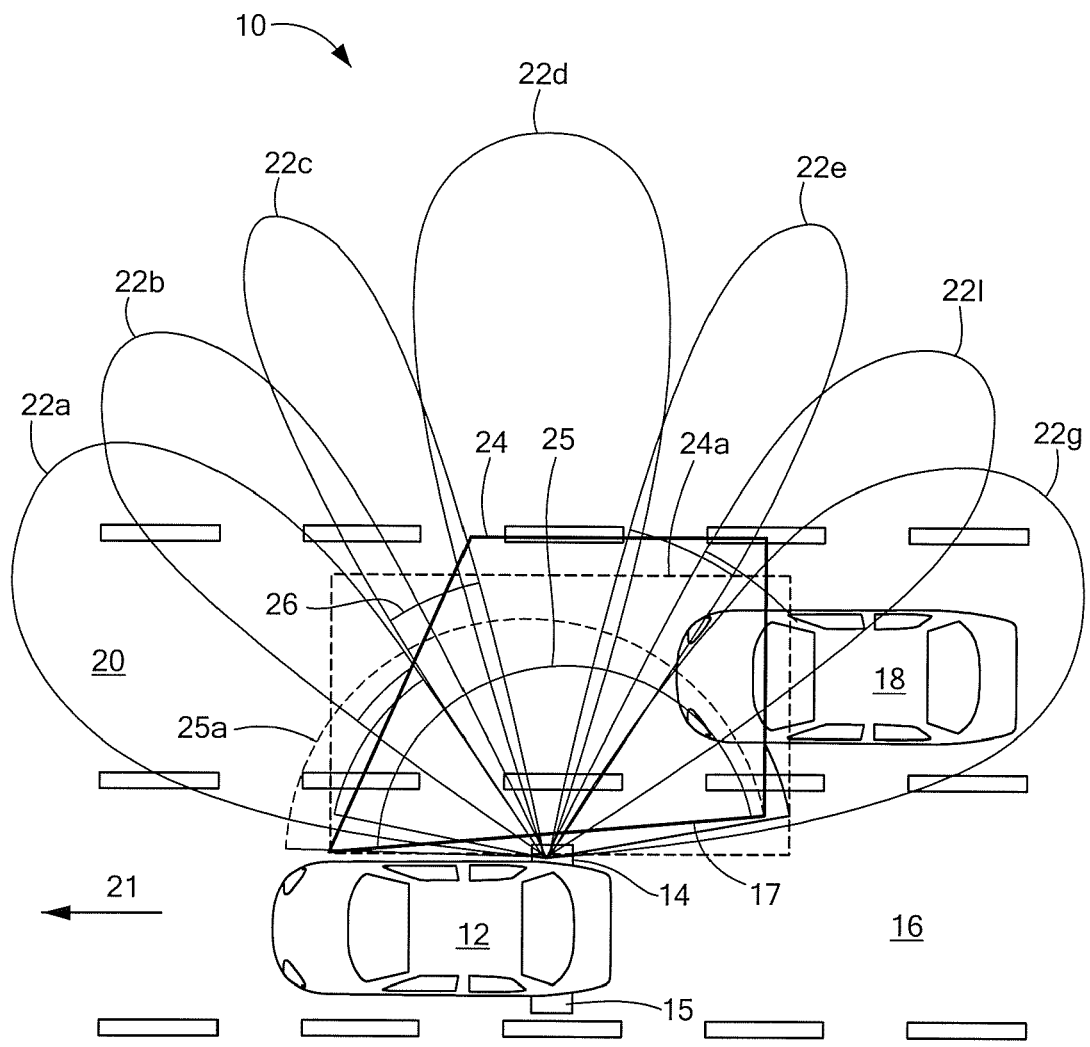
FIG. 1 is a diagrammatic view of a pair of vehicles traveling along a roadway.

Referring now to FIG. 1, a first vehicle 12 traveling in a first traffic lane 16 of a road includes a side-object detection (SOD) system 14. The SOD system 14 is disposed on a side portion of the vehicle 12 and in particular, the SOD system 14 is disposed on a right rear quarter of the vehicle 14. The vehicle 12 also includes a second SOD system 15 disposed on a side portion of a left rear quarter of the vehicle 12. The SOD systems 14, 15 may be coupled to the vehicle 12 in a variety of ways. In some embodiments, the SOD systems may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent the first traffic lane 16. The first and second vehicles 12, 18 are both traveling in a direction 21 and in the respective first and second traffic lanes 16, 20.

The second vehicle 18 may be traveling slower than, faster than, or at the same speed as the first vehicle 12. With the relative position of the vehicles 12, 18 shown in FIG. 1, the second vehicle 18 is positioned in a "blind spot" of the first vehicle 12. In general, a blind spot is an area which an operator of a vehicle (e.g. vehicle 12) is unable to see. This may be, for example, an area located on a side of the first vehicle 12.

In the exemplary embodiment of FIG. 1, the operator of the first vehicle (i.e. vehicle 12) is unable to see the second vehicle (i.e. vehicle 18) either through side-view mirrors 84, 86 (see FIG. 2) or a rear-view mirror (not shown) of the first vehicle 12.

In the exemplary system described herein, the SOD system 14 generates multiple receive beams (e.g., a receive beam 22a, a receive beam 22b, a receive beam 22c, a receive beam 22d, a receive beam 22e, a receive beam 22f and a receive beam 22g) which detect objects in an associated detection zone 24. The shape of the detection zone 24 is formed by the SOD system 14 by selection of maximum detection ranges associated with each one of the receive beams 22a-22g. In the exemplary embodiment of FIG. 1, for example, the maximum detection ranges of each of beams 22a-22g are selected to provide a detection zone such as detection zone 24 having a desired shape. For example, beam 22c has a maximum detection range associated therewith which is designated by reference line 26. Each of the beams 22a-22g may also have a minimum detection range (not shown), forming an edge 17 of the detection zone 24 closest to the first vehicle.

It should thus be appreciated that detection zone 24 may be provided having any number of different desired shapes such as a substantially rectangular shape denoted by reference numeral 24a in FIG. 1. Other shapes, may of course, also be used. One of ordinary skill in the art will appreciate how to select a detection zone shape for a particular application.

In one particular embodiment, the SOD system 14 is a frequency modulated continuous wave (FMCW) radar, which transmits continuous wave chirp radar signals, and which processes received radar signals accordingly. In some embodiments, the SOD system 14 may be the same as or similar to the type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD system 14 transmits a radio frequency (RF) signal. Portions of the transmitted RF signal impinge upon and are reflected from objects in the path of the transmitted signal such as the second vehicle 18. The reflected signals (also referred to as "echo" signals) are received in one or more of the receive beams 22a-22g. Other ones of the radar beams 22a-22g, which do not receive the echo signal from the second vehicle 18, receive and/or generate other radar signals, for example, noise signals. As used herein, the term "noise signal" is used to describe a signal comprised of one or more of a thermal noise signal, a quantization noise signal, a crosstalk signal (also referred to as leakage or feed through signal), and an ambient RF noise signal.

In some embodiments, the SOD system 14 may transmit RF energy in a single broad transmit beam (not shown). In other embodiments, the SOD system 14 may transmit RF energy in multiple transmit beams, for example, in seven transmit beams associated with the receive beams 22a-22g. In still other embodiments, the SOD system may transmit RF energy in multiple transmit beams and receive return signals in a single receive beam.

In operation, the SOD system 14 may process the received radar signals associated with each one of the beams 22a-22g in sequence, in parallel, or in any other time sequence. The SOD system 14 identifies an echo signal associated with the second vehicle 18 when any portion of the second vehicle 18 is within the detection zone 24. Therefore, the SOD system 14 is adapted or configured to detect the second vehicle 18 when at least a portion of the second vehicle is in or near the blind spot of the first vehicle 12. One form of blind spot detection processing is described in PCT application number PCT/US2007/023019 published in the English language as WO/2008/063367 on May 29, 2008 and incorporated herein in by reference in its entirety.

SOD systems 14, 15 are also able to detect a blockage condition (or more simply a "blockage") via a blockage detection system. The operation of such a blockage detection system will be described in detail below in conjunction with FIGS. 2-8. For reasons which will become apparent from the description hereinbelow, the blockage detection system establishes a virtual detection zone (VDZ) 25. In one embodiment, VDZ 25 corresponds to a region defined by a 3.5 meter radius as measured from SOD 14.

It should thus be appreciated that VDZ 25 may be provided having any number of different desired shapes. For example, in some embodiments, it may be desirable to establish a VDZ having substantially the same shape as detection zone 24. In other embodiments, it may be desirable to provide a VDZ having a portion thereof outside detection zone 24. For example VDZ 25a has a front portion outside of detection zone 24. In other embodiments, a VDZ may be provided having a back portion outside of detection zone 24. In still other embodiments, a VDZ may be provided having both front and back portions outside of detection zone 24. Also, although VDZ 25 is shown having a radial shape, other shapes, may of course, also be used. After reading the description provided herein, one of ordinary skill in the art will appreciate how to select a VDZ shape for a particular application.

Figure 1A:
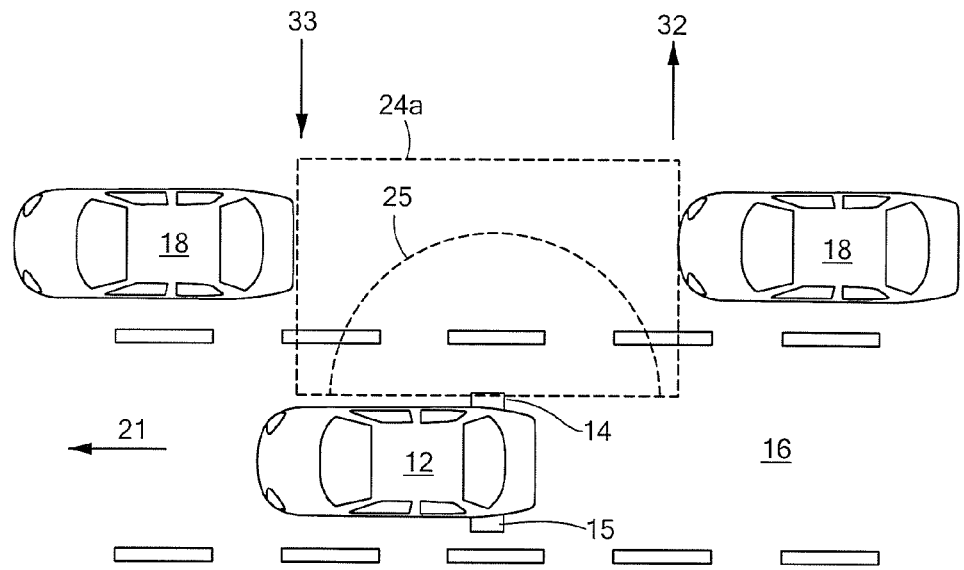
FIG. 1A is a diagrammatic view of a first vehicle entering and exiting a detection zone of a second vehicle as the vehicles travel along a roadway.
Figure 1B:
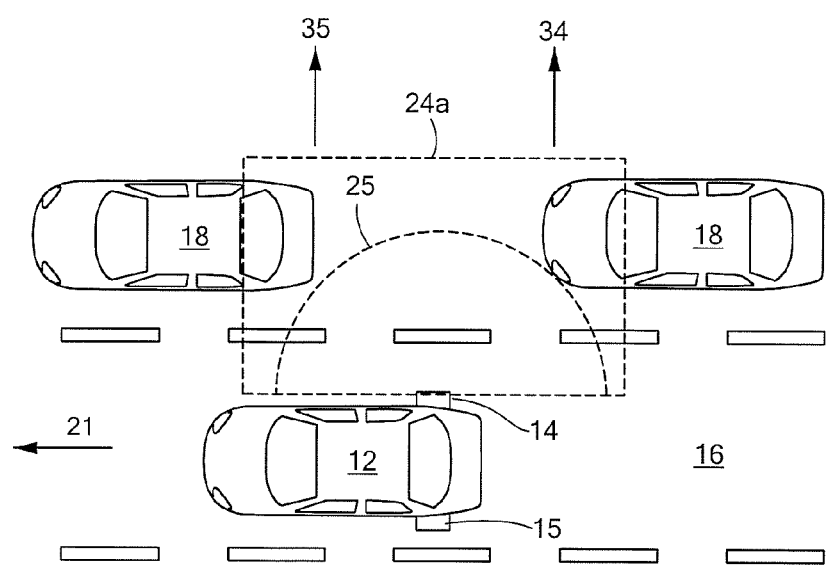
FIG. 1B is a diagrammatic view of a first vehicle entering and exiting a virtual detection zone (VDZ) of a second vehicle as the vehicles travel along a roadway.

Referring briefly to FIGS. 1A and 1B in which like elements of FIG. 1 are provided having like reference designations, when an object such as vehicle 18 first enters detection zone 24a, SOD 14 generates (i.e. turns on) a blind spot alert (BSA) signal 32. BSA signal 32 stays on while vehicle 18 is in the detection zone 24. When vehicle 18 leaves the detection zone 24a, the blind spot alert signal turns off (i.e. SOD 14 stops generating the BSA signal) as indicated by reference numeral and arrow 33. It should be appreciated that SOD may generate BSA signal 32 at any time during which a target (e.g. vehicle 18) is in the detection zone 24a. Thus, although in the exemplary scenario illustrated in FIG. 1A, BSA signal 32 is shown being generated immediately upon entry of vehicle 18 in detection zone 24a, it should be appreciated that in other then scenarios, BSA signal 32 may not be generated until vehicle 18 has traveled a further distance into detection zone 24a.

In still other scenarios, (e.g. in the case of a blockage on SOD 14), SOD 14 may not be able to collect enough data or collect enough detections of a target (e.g. a target such vehicle 18) while the target is in the detection zone 24a to allow generation of a BSA signal. Thus, in this scenario, SOD 14 does not generate a BSA signal (i.e. due to a lack of data or a lack of target detections collected by SOD 14).

Nevertheless, even though the SOD 14 has not generated a BSA signal, SOD 14 continues to collect data while vehicle 18 is in the detection zone 24. Furthermore, if SOD 14 determines that vehicle 18 enters VDZ 25, SOD 14 (and in particular, a blockage detection system within the SOD) collects data/information concerning vehicle 18 while vehicle 18 is in the VDZ 25. Reference numeral 34 in FIG. 1A, denotes entry of vehicle 18 in VDZ 25 and it is at this point that SOD 14 begins collects data/information concerning vehicle 18.

Based upon the information collected in the VDZ 25 and logic applied to such information, SOD 14 may determine that a vehicle is in the detection zone even though the SOD 14 never generated a BSA signal. In this case, when vehicle 18 leaves the VDZ 25, if SOD 14 has still never generated a BSA signal for vehicle 18, then the SOD generates a missed alert signal 35. Thus, reference numeral 35 in FIG. 1B, denotes both exit of vehicle 18 from the VDZ 25 and the generation of a missed alert signal 35.

Figure 2:
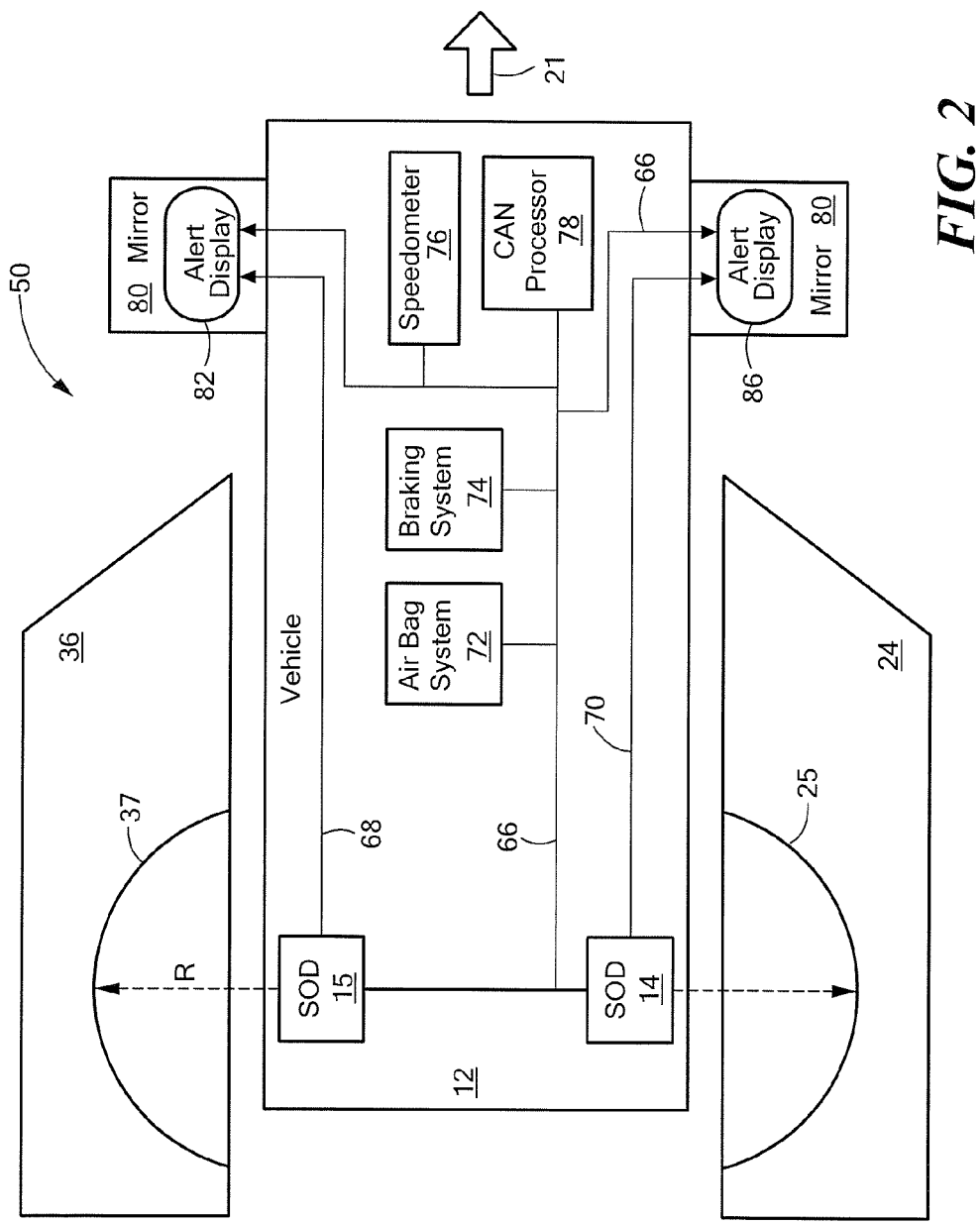
FIG. 2 is a block diagram of an automotive radar system.

Referring to FIG. 2, an exemplary vehicle system 50 which may be the same as or similar to the vehicle systems included in vehicles 12, 18 described above in conjunction with FIG. 1, includes vehicle systems such as SOD systems 14, 15, an air bag system 72, a braking system 74, and a speedometer 76.

Each one of the SOD systems 14, 15 is coupled to a Controller Area Network (CAN) processor 78 through a Controller Area Network (CAN) bus 66. As used herein, the term "controller area network" is used to describe a control bus and associated control processor typically found in vehicles. For example, the CAN bus 66 and associated CAN processor 78 may control a variety of different vehicle functions such as anti-lock brake functions, air bags functions and certain display functions.

The vehicle 12 includes two side-view mirrors 80, 84, each having an alert display 82, 86, respectively, viewable therein. Each one of the alert displays 82, 86 is adapted or configured to provide a visual alert to an operator of a vehicle in which system 50 is disposed (e.g., vehicle 12 in FIG. 1) to indicate the presence of another vehicle in a blind spot of the vehicle. To this end, in operation, the SOD system 14 forms detection zone 24 and a virtual detection zone 25 and SOD system 15 forms a detection zone 36 and a virtual detection zone 37.

In one embodiment, VDZs 25, 37 are each provided having a substantially arc shape with an length of about 160 degrees and an arc radius of about 350 centimeters (cm) as measured from substantially the centerlines of the respective SODS 14, 15 (i.e. VDZ are provided having 160 degree wedge extending from SOD at center with radius of 350 cm). The VDZs 25, 37 may, of course, be provided having a radius which is greater or less than 350 cm, For example, radii of 250 cm or 450 cm may also be used. After reading the description herein, those of ordinary skill in the art will appreciate how to select a radius for a particular application. Furthermore, as mentioned above, in some embodiments VDZs 25, 37 may be provided having a shape which is different than an arc shaped (e.g. a rectangular, triangular, oval or irregular shape may be used). It should also be appreciated that VDZs need not have identical or substantially identical shapes. That is, in some applications it may be desirable to provide VDZ 25 having a first shape which substantially corresponds to one of an arc, rectangular, triangular, oval or irregular shape while VDZ 37 is provided 25 having a second different shape which substantially corresponds to a different one of an arc, rectangular, triangular, oval or irregular shape.

Upon detection of an object (e.g., another vehicle, a guard rail, a tree, a building and so forth) in the detection zone 24, the SOD system 14 sends an alert signal indicating the presence of an object to either or both of the alert displays 82, 86 through the CAN bus 66. In response to receiving the alert signal, the alert displays provide an indication through an indicator (e.g., a visual, audio, or mechanical indicator) which indicates the presence of an object. Similarly, upon detection of an object in the detection zone 36 SOD system 15 sends an alert signal indicating the presence of another vehicle to one or both of alert displays 82, 86 through the CAN bus 66. However, in an alternate embodiment, the SOD system 15 may communicate the alert signal to the alert display 82 through a human/machine interface (HMI) bus 68. Similarly, SOD system 14 may communicate the alert signal to the other alert display 86 through another human/machine interface (HMI) bus 70. As used herein an alert signal may include an alert signal to turn on an alert or an alert signal to turn off an alert. As will be described below, the mere detection or lack of detection of an object in the detection zone 24, 36 may not necessarily generate an alert signal. Other circuitry and/or program code logic may be implemented within or external to the SOD to ensure that the alert signal is sent when certain criteria are met based upon the data received at the receiver 158 (see, for example, FIGS. 5 to 12).

Figure 3:
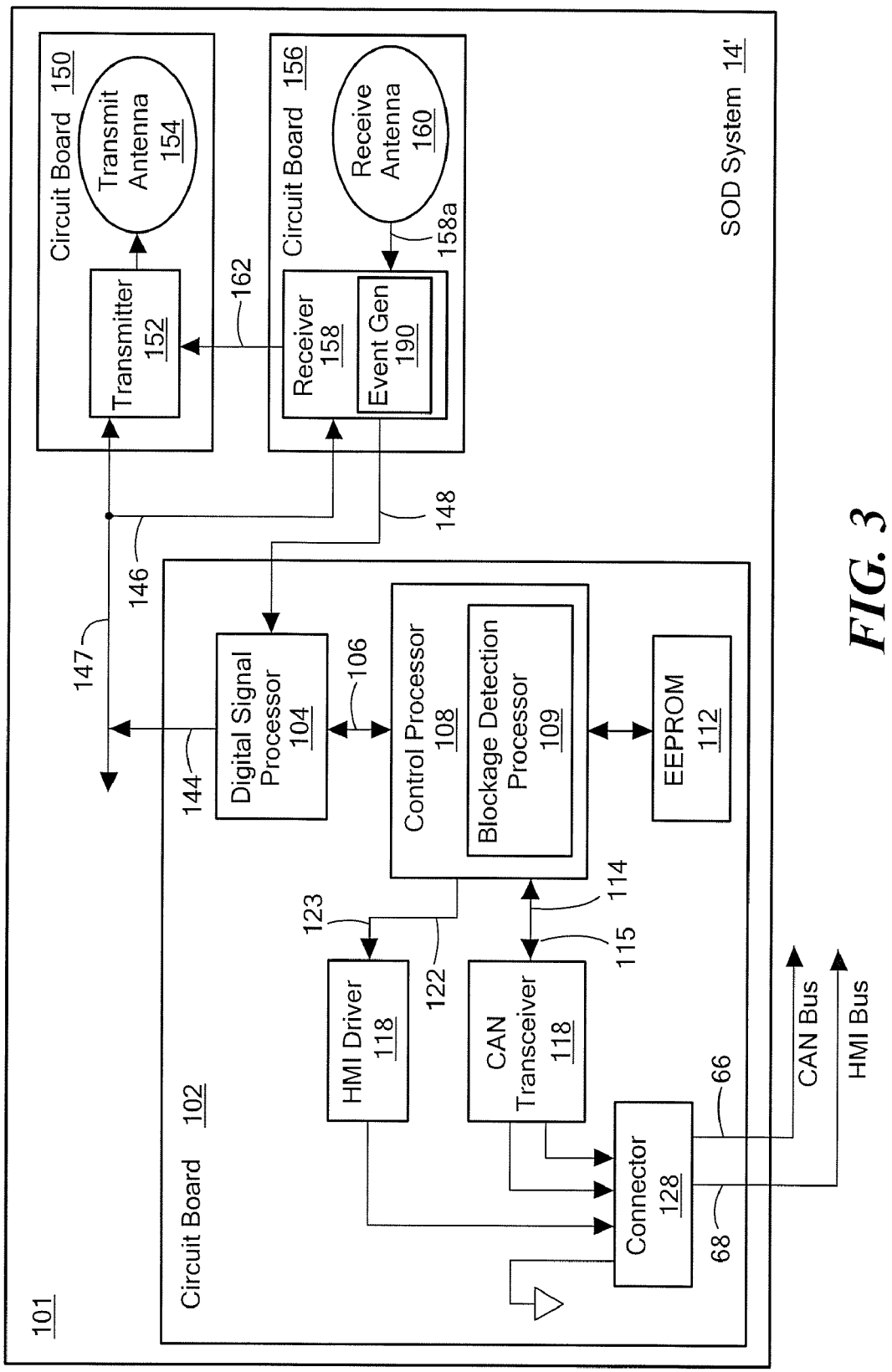
FIG. 3 is a block diagram of a side object detection (SOD) system of a vehicle radar system.

Referring now to FIG. 3, a SOD system 14' which may be the same as or similar to SODs 14 and 15 described above in conjunction with FIGS. 1 and 2, includes a housing 101 having a plurality of circuit boards 102, 150, 156 disposed therein. It should be appreciated that while any number of circuit boards can be used, in this exemplary embodiment, three circuit boards are used and the particular type of material from which each circuit board is provided is selected to satisfy all circuit performance and cost requirements. For example, circuit board 102 may be provided as a fiberglass circuit board; circuit board 150 may be provided as a low temperature co-fired ceramic (LTTC) circuit board or as a polytetrafluoroethylene (PTFE) circuit board 150; and circuit board 156 may be provided as an LTCC circuit board 156. Other materials may, of course, also be used for each circuit board as long as circuit performance and cost criteria are satisfied. Those of ordinary skill in the art will understand how to select a particular material for each circuit board depending upon a variety of factors including but not limited to technical (e.g., engineering) requirements and cost.

The circuit board 102 has disposed thereon a digital signal processor (DSP) 104 coupled to a control processor 108. In general, the DSP 104 is configured to perform signal processing functions, for example, fast Fourier transforms (FFTS) on signals provided thereto from the receiver. In some embodiments, the DSP 104 may be of a type described, for example, in U.S. Pat. No. 7,071,868, filed Apr. 8, 2005 assigned to the assignee of the present application and which is incorporated herein by reference in its entirety. The control processor 108 is also configured to perform digital functions, for example, to identify conditions under which an operator of a vehicle on which the SOD system 14 is mounted should be alerted to the presence of another object such as a vehicle in a blind spot or to determine whether a blockage condition exists. For example, DSP 104 computes a list of individual sensor detection ranges (e.g. detections 250 in FIG. 7) for each of the radar beams and provides such information (or data) to control processor 108 for use by a blockage detection processor 109 in determining whether a blockage condition exists.

The control processor 108 is coupled to a memory 112 which is here illustrated as an electrically erasable read-only memory (EEPROM) 112. Other types of memory may, of course, also be used. Memory 112 is adapted or configured to retain a variety of values including but not limited to calibration values. For example, control processor 108 receives calibration parameters related to counter and timer settings from external memory 112 (which may be provided as an EEPROM, for example) for use in determining whether a blockage condition exists. Other memories, including other read only memories, associated with processor program memory are not shown for clarity. The control processor 108 is coupled to a CAN transceiver 120, which is adapted or configured to communicate, via a connector 128, on the CAN bus 66. A blockage alert signal 115 can be provided to either or both of HMI driver 118 or CAN transceiver 120. In the case where blockage alert signal 115 is provided to HMI driver 118 the blockage alert signal 115 propagates on the HMI bus and can be electrically coupled to an icon which turns on to alert a driver to a blockage condition. Alternatively or additionally, if blockage alert signal 115 is provided to CAN transceiver 120, the blockage alert signal 115 propagates on the CAN bus and can be electrically coupled to a screen display (e.g. a scrolling screen display) to alert a driver to a blockage condition.

The control processor 108 is also coupled to an optional human/machine interface (HMI) driver 118, which in turn is coupled via the connector 128, to the HMI bus 68. The HMI bus 68 may include any form of communication media and communication format, including, but not limited to, a fiber optic media with an Ethernet format, and a wire media with a two state format.

The circuit board 150 includes a radar transmitter 152 coupled to a transmit antenna 154. Transmitter 152 is also coupled to DSP 104 through an interface 147 and a bus 144. In one embodiment, the interface 147 is provided as a serial port interface (SPI) 147.

The circuit board 156 includes a receive antenna 160 coupled to a receiver 158. Receiver 158 includes an event generator which may be the same as or similar to the type described in PCT Application PCT/US2007/023019 published in the English Language on May 29, 2008 as WO 2008/063367 which application is assigned to the assignee of the present invention and hereby incorporated herein by reference in its entirety. Receiver 158 is, in turn, coupled to the DSP 104 and to the transmitter 152. In some embodiments, the receiver 158 is coupled to the DSP 104 through a bus 146 which is coupled to interface 147 which in turn is coupled to bus 144 through the SPI 147 and a bus 146. The radar transmitter 152 and the radar receiver 158 may receive regulated voltages from a voltage regulator. The receiver 158 also provides RF signals to the transmitter 152 through a signal path 162.

In operation, the DSP 104 initiates one or more chirp control signals (also referred to as ramp signals) by providing a command signal to event generator 190 via signal path 148. In response to the command signal from the DSP, the event generator 190 generates the chirp control signals. Thus, the event generator removes the chirp control signal processing function from the DSP 104. In other embodiments the chirp generator may be located in the receiver 158. In still other embodiments, however, the event generator 190 can be located in other portions of the radar system 14' (FIG. 3).

It should be understood that by removing the control signal waveform responsibility from the DSP 104 and providing a dedicated event generator circuit which is separate from the DSP, the event generator may provide more comprehensive chirp control signals. This is because the DSP 104 must serve multiple and differing types of requests while the event generator serves only to generate control signals related to generation of the chirp control signals. Also, the required accuracy of the timing signals created by the event generator also precludes the event generator from being the direct responsibility of the DSP 104. Also, the DSP 104 is now freed from this time consuming activity, so it can now perform additional critical tasks in parallel.

Each chirp control signal has a start voltage and an end voltage. The chirp control signal is provided to a signal source. In response to the ramp signals, the signal source generates RF signals having waveform and frequency characteristics determined or controlled by the chirp control signal. The transmitter feeds the RF signals to the transmit antenna 154 which emits (or radiates) the RF signals as RF chirp radar signals. As used herein, the term "chirp" is used to describe a signal having a characteristic (e.g., frequency, amplitude, or any other characteristic or combinations of any characteristics) that varies with time during a time window.

Typically, in those instances when the frequency of the signal is varied, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals by the event generator 190 for so-called major cycles. The DSP 104 causes the event generator to execute a pre-programmed set of actions, which will cause a signal source (e.g., a VCO) to be modulated accordingly, for each minor cycle in turn. A major cycle is a time period during which signals are received in a designated set of the receive beams 22a-22g. The designated set of receive beams may be all of the receive beams 22a-22g or the designated set of receive beams may be only some of the receive beams 22a-22g. A major cycle is comprised of one or more so-called minor cycles. A minor cycle is a period of time during which signals are received in a subset (e.g. one or more) of the designated set of receive beams.

As mentioned above, the DSP 104 causes the event generator 190 (FIG. 4) to execute for each minor cycle. Thus, for each major cycle, the DSP issues a so-called "go" command several times per major cycle. The event generator 190, in turn, provides controls signals or values in each minor cycle including the transmission of the ramp control signals (or more simply "ramp signals") in each minor cycle.

The transmit antenna 154 may be provided having one or a plurality of transmit beams. Regardless of the particular number of transmit beams, the transmit antenna 154 emits one or more RF chirp radar signals in one or more desired fields of view (e.g., summed or individually covering the detection zone 24 in FIG. 1). The transmit beams may be similar or different in antenna pattern and may be similar or different in fields of view. The fields of view of the transmit beams may overlap to varying extents, from completely overlapped to not at all overlapped.

The receive antenna system 160 may utilize one or a plurality of receive beams. The receive beams may be similar or different in antenna pattern and may be similar or different in fields of view. Like the transmit beams, the fields of view of the receive beams may overlap to varying extents, from completely overlapping to not overlapping at all. The SOD 14 in FIG. 1, for example, utilizes seven receive beams 22a-22g each of which overlaps at least one other beam.

Each of the receive beams receives return or echo radar signals, or otherwise generates and/or receives noise signals. Signals received through the receive beams are coupled to radar receiver 158. Radar receiver 158 receives the RF signals provided thereto from the antenna, down converts the received RF signals to an intermediate frequency (IF) signal, and provides an output signal on signal path 148. In addition to the frequency down conversion, the receiver 158 appropriately processes the RF input signals provided thereto from the receive antenna system 160 such that the output signals on the signal path 148 can be appropriately received and processed by the DSP 104.

The signal provided to the input of DSP 104 has a frequency content, wherein signal level peaks which occur at different frequencies correspond to detected objects at different ranges. The DSP 104 analyzes the signals provided thereto and identifies objects in a detection zone e.g. detection zones 24 or 36.

Some objects identified by the DSP 104 may be objects for which an operator of the first vehicle 12 (FIG. 1) has little concern and need not be alerted. For example, an operator of vehicle 12 may not, in some instances, need to be alerted or continuously alerted as to the existence of a stationary guardrail along the roadside. Thus, criteria additional to the presence of an object in or near the detection zone may be used to determine when an alert signal should be generated or terminated.

To utilize further criteria, the control processor 108 receives object detections on a bus 106 from the DSP 104. The control processor 108 applies a series of factors and characteristics (i.e., criteria used in addition to that used by DSP 104 to identify an object) to control generation of an alert signal and/or a blockage detection signal. For example, upon determination by the control processor 108, an alert signal or a blockage detection signal may be generated and sent through a bus 114 to CAN transceiver 120 and communicated on the CAN bus 66, In the case of an alert signal, the signal is indicative not only of an object in the detection zone 24, but also is indicative of an object having predetermined characteristics being in the detection zone. In other embodiments, an alert signal may be communicated by control processor 108 on a bus 122 through the HMI driver 118 to the HMI bus 68. In the case of a blockage detection signal, the signal is indicative of the existence or the potential existence of a blockage which undesirably blocks portions of the RF energy propagating to and from the transmit and/or receive antenna of the SOD thereby affecting the effectiveness of the SOD system 14.

The circuit board 102, the circuit board 150, and the circuit board 156 are comprised of materials having known behaviors for signals within particular frequency ranges. It is known, for example, that fiberglass circuit boards have acceptable signal carrying performance at signal frequencies up to a few hundred MHz. LTCC circuit boards and PTFE circuit boards are known to have acceptable signal carrying performance characteristics at much higher frequencies. Thus, in the case where circuit board 102 is provided as a fiberglass circuit board and circuit boards 150, 156 are provided from LTCC and/or PTFE, circuits and circuitry which perform the lower frequency functions of the SOD system 14 are disposed on the circuit board 102, while circuits and circuitry which perform the functions having relatively high frequencies (e.g. above approximately 2 GHz) are disposed on the LTCC and on the PTFE circuit boards 150, 156, respectively. Nevertheless, suitable materials other than those specifically mentioned herein may of course, also be used.

Figure 4:
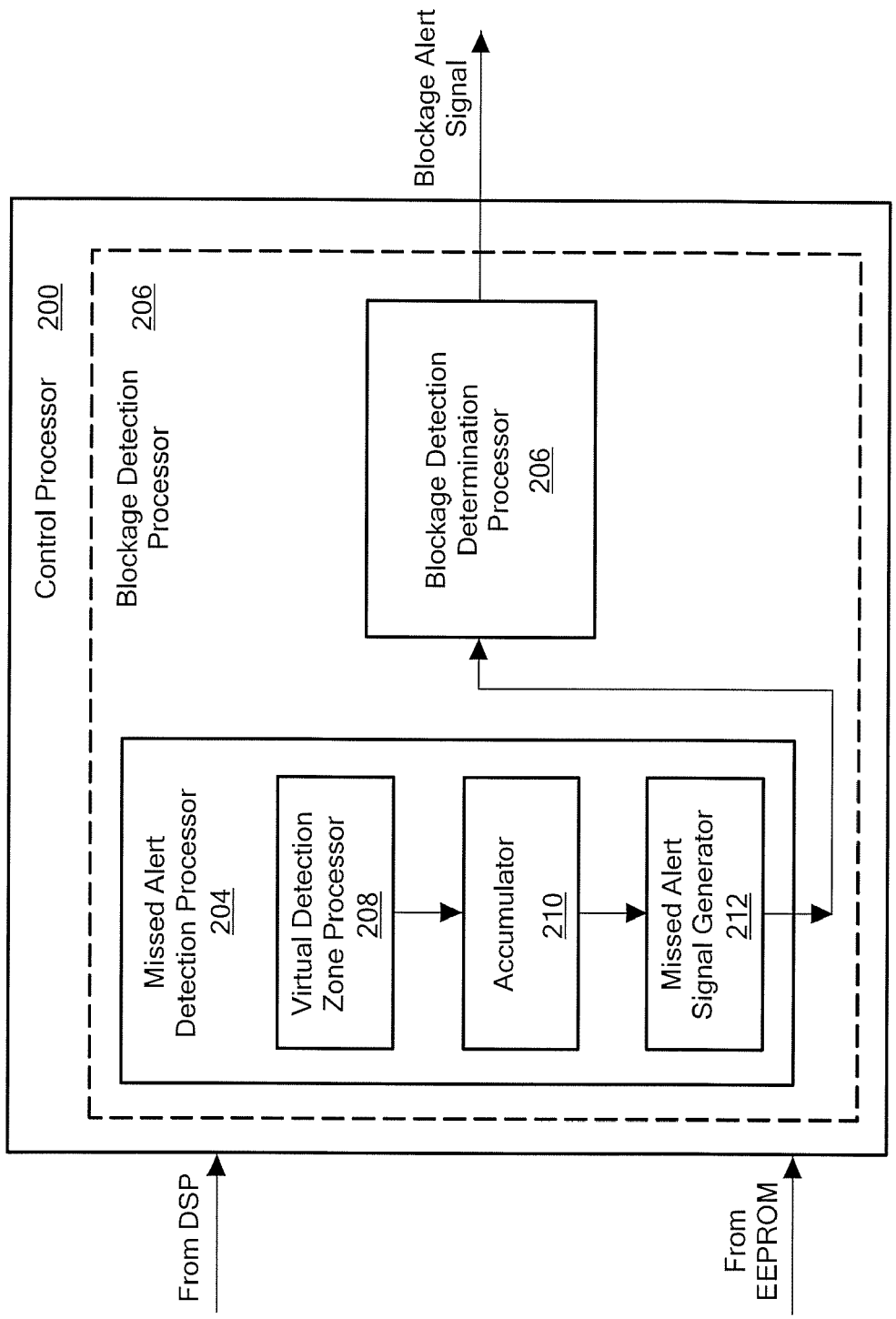
FIG. 4 is a block diagram of a control processor which includes a blockage detection processor.

Referring now to FIG. 4, a control processor 200, which may be the same as or similar to control processor 108 described above in conjunction with FIG. 3, includes a blockage detection processor 202 which may be the same as or similar to blockage detection processor 109 described above in conjunction with FIG. 3. Blockage detection processor 202 receives data on one or more inputs (for explanation purposes two inputs are shown in FIG. 4). The data provided to blockage detection processor 202 corresponds to radar return information which may or may not have been processed prior to being provided to the blockage detection processor 202. In one embodiment, the inputs are provided from a processor (e.g. DSP 104 described above in conjunction with FIG. 3) and a memory (e.g. EEPROM described above in conjunction with FIG. 3) and the information related to the target may correspond to statistics, including, but not limited to one or more of target range history, range of closest approach, point of closest approach, angle, angle history, speed, time spent by a target in a virtual detection zone, number of total detections, raw radar detection count and detection density as a function of range and/or angle.

Blockage detection processor 202 includes a missed alert detection processor 204 coupled to a blockage detection determination processor 206.

In general overview, in response to the signals provided thereto, the missed alert detection processor 204 generates one or more missed alert signals and provides the missed alert signals to the blockage detection determination processor 206. The blockage detection determination processor 206 analyzes the missed alert signals provided thereto and determines whether a blockage condition exists and/or if alert signal should be generated. Once a determination is made that a blockage condition exists and/or that blockage detection alert signal should be provided, the blockage detection determination processor 206 provides a signal indicating that an alert signal should be provided).

Missed alert detection processor 204 includes a virtual detection zone processor 208 coupled to an accumulator 210 which in turn is coupled to a missed alert flag generator 212. Virtual detection zone processor 208 is configured to identify when a target detection occurs in a virtual detection zone. Once a target detection occurs, the accumulator begins accumulating information on the target which has been detected within the virtual detection zone. The accumulator continues to collect information on the target as long as it remains in the virtual detection zone. The accumulator collects statistics related to target behavior including but not limited to target range history, angle history, speed, time in virtual detection zone, and detection density as a function of range and angle and, if appropriate, the accumulator provides a signal to a missed alert signal generator. At some point the target leaves the virtual detection zone. It is at this point that the missed alert determination is made.

In turn, once a determination is made that an alert was missed, the missed alert signal generator provides a missed alert signal to the blockage detection determination processor 206.

In general, the blockage detection determination processor 206 tracks the number of "misses" as well as the amount of time which elapses between misses. For example, the blockage detection determination processor 206 tracks the number of misses which occur by tracking the number of missed alert signals which are generated. Also, the blockage detection determination processor 206 can track time by tracking the number of major cycles which occur between missed alert signals. It should, of course, be appreciated that other indications of a target or object not being detected (i.e. a "miss" or more properly a "missed alert signal") can also be counted and that time can be tracked by simply utilizing a system clock. It should be appreciated that "a major cycle" as that term is used herein, refers to the time it takes for a SOD (e.g. SOD 14 in FIG. 1) to transmit a signal and receive a signal in all receive beams.

Figure 5:
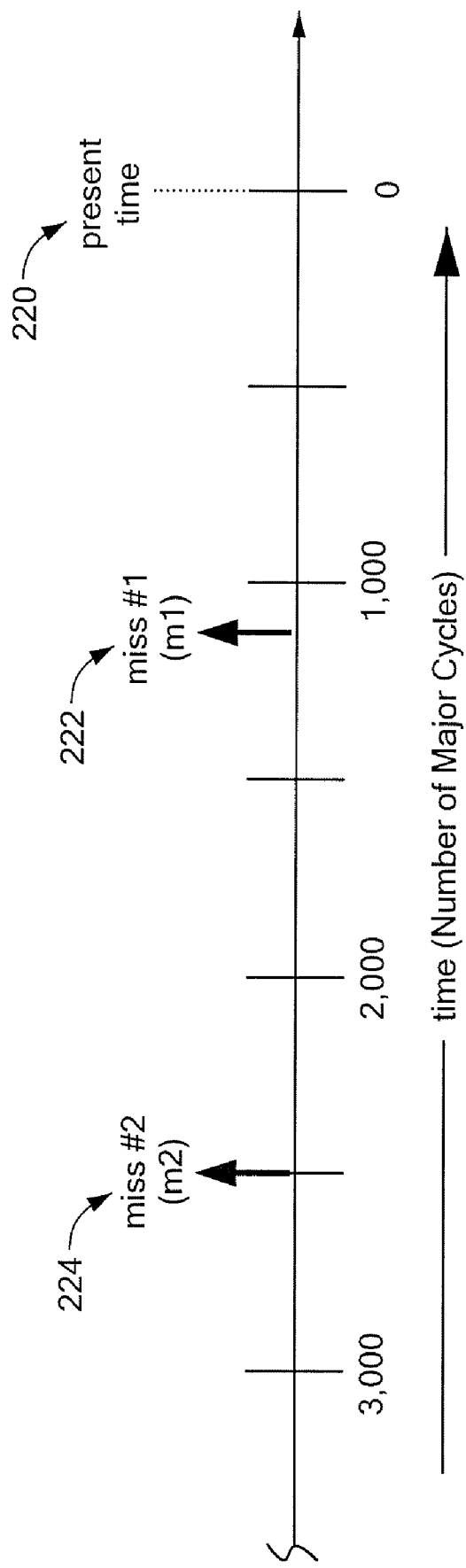
FIG. 5 is a plot of missed alert signals v. time.

As shown in FIG. 5, a time line 220 (in units of the number of major cycles), illustrates that a "miss" 224 (denoted as "miss #2 in FIG. 5) was detected at 2,500 major cycles and that another miss 222 (denoted as "miss #1 in FIG. 5) was detected at 1,125 major cycles. It should be appreciated that the number of cycles is counted relative to a present time. Thus, miss #2 occurred (in time) prior to miss #1 (or stated differently miss #1 occurred more recently than miss #2) and as measured from a present point in time (i.e. t=0), the number of major cycles since the last miss is the number of cycles from the present time to miss #1—i.e. 1,125 major cycles.

In one embodiment, the system can utilize one or more metrics or logical conditions to determine if a blockage condition exists. For example, in one embodiment, if a predetermined number of missed alert signals (e.g. "M" missed alert signals or more simply "M misses") are generated within a predetermined period of time (e.g. N minutes), then a blockage condition is declared to exist. This metric can be selected prior to assembling a SOD on a vehicle and the values of M and N can be stored a memory of the SOD (e.g. an EEPROM such as EEPROM 112 in FIG. 3). With this approach, inadvertent missed alert signals do not result in a blockage condition being declared by a SOD. That is, this technique reduces or in some cases suppresses the number of false blockage alert signals (i.e. signal 115 in FIG. 3) generated by the SOD. It should be appreciated that the data of FIG. 5 (e.g. one or more of the time of the misses, the number of misses, the time between misses, etc. . . . ) can be stored in a memory (e.g. a RAM) in one of processors 108 or 109 or coupled to one of processors 108 or 109. It should also be appreciated that the data is stored such that different time windows can be accessed (e.g. the number of misses in a 20 second window can be accessed as can the number of misses in a 10 minute window).

Referring again to FIG. 4, blockage detection determination processor 206 utilizes the information in the timeline and calibration parameter values (e.g. from a storage device such as the EEPROM 112 in FIG. 3) to determine whether the missed alerts are due to a blockage. For example, in one exemplary embodiment, blockage is determined to be present if the system detects M misses in N minutes. In one embodiment M and N are stored in a storage device such as EEPROM 112 in FIG. 3 during manufacture or set-up of a SOD. A calculation is made each major cycle to determine if the Mth miss as shown in FIG. 5 occurred in less than N minutes where the number of major cycles is converted to minutes using a factor of 7500 major cycles/minute for the calculation. If blockage detection determination processor 206 concludes that a blockage exists, then it provides a blockage alert signal or some other indication of a blockage condition.

Figure 6:
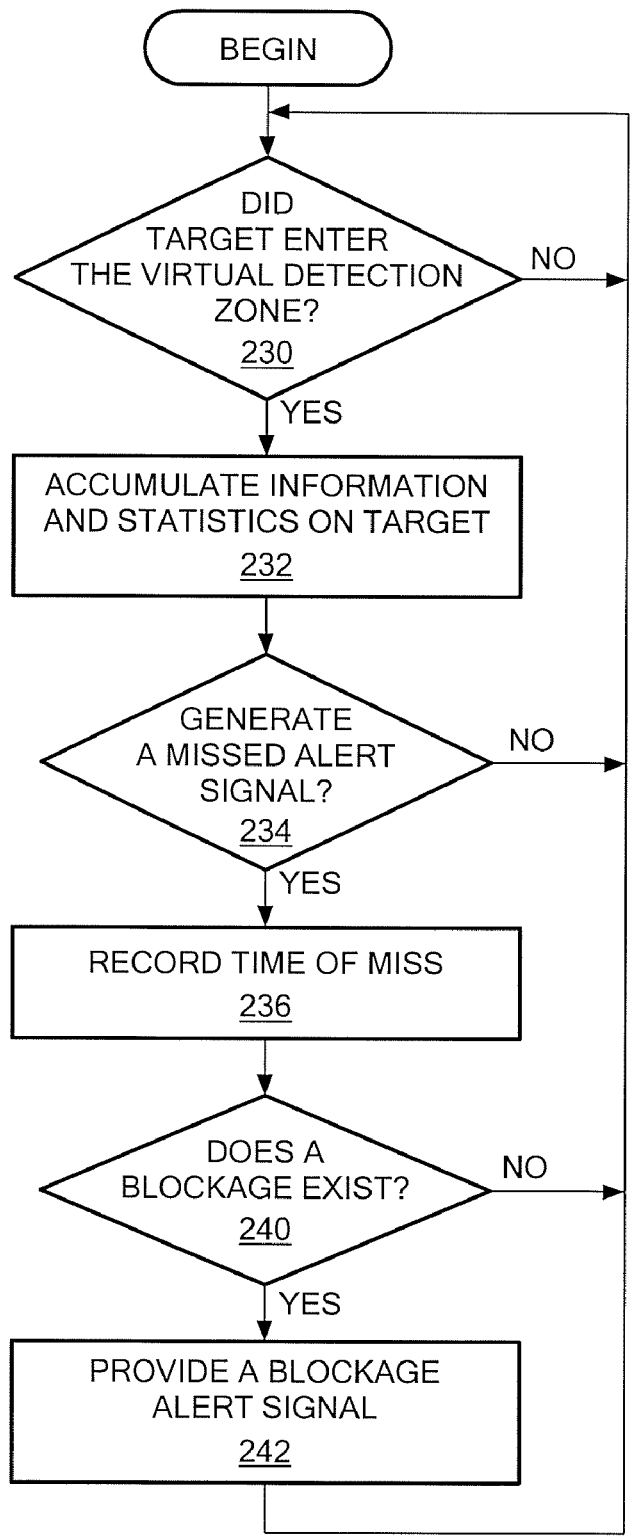
FIG. 6 is a flow diagram of a process for detecting blockage in an automotive radar system.

FIG. 6 is a flow diagram which illustrates the processing performed by a processing apparatus which may, for example, be provided as part of an automotive radar system such as that described in conjunction with FIGS. 1 and 2 above to determine whether a blockage condition exists in a sensor such as a SOD sensor 14 described above in conjunction with FIGS. 1 and 2. The rectangular shaped elements in the flow diagram (typified by element 232 in FIG. 6) are herein denoted "processing blocks" and represent computer software instructions or groups of instructions. The diamond shaped elements in the flow diagrams (typified by element 230 in FIG. 6) are herein denoted "decision blocks" and represent computer software instructions or groups of instructions which affect the processing of the processing blocks.

Alternatively, the processing and decision blocks in FIG. 6 can represent processes performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to generate computer software and/or to program or fabricate circuits, to perform the processing required of the particular apparatus. It should be noted that many routine program elements, such as initialization of loops and variables and the use of temporary variables are not shown.

It should also be noted that some of the processing blocks can represent an empirical or manual procedure or a database function while others can represent computer software instructions or groups of instructions. Thus, some of the steps described in the flow diagram may be implemented via computer software while others may be implemented in a different manner e.g. manually, via an empirical procedure, via hardware or via a combination of manual and empirical procedures and/or hardware and software.

Figure 7:
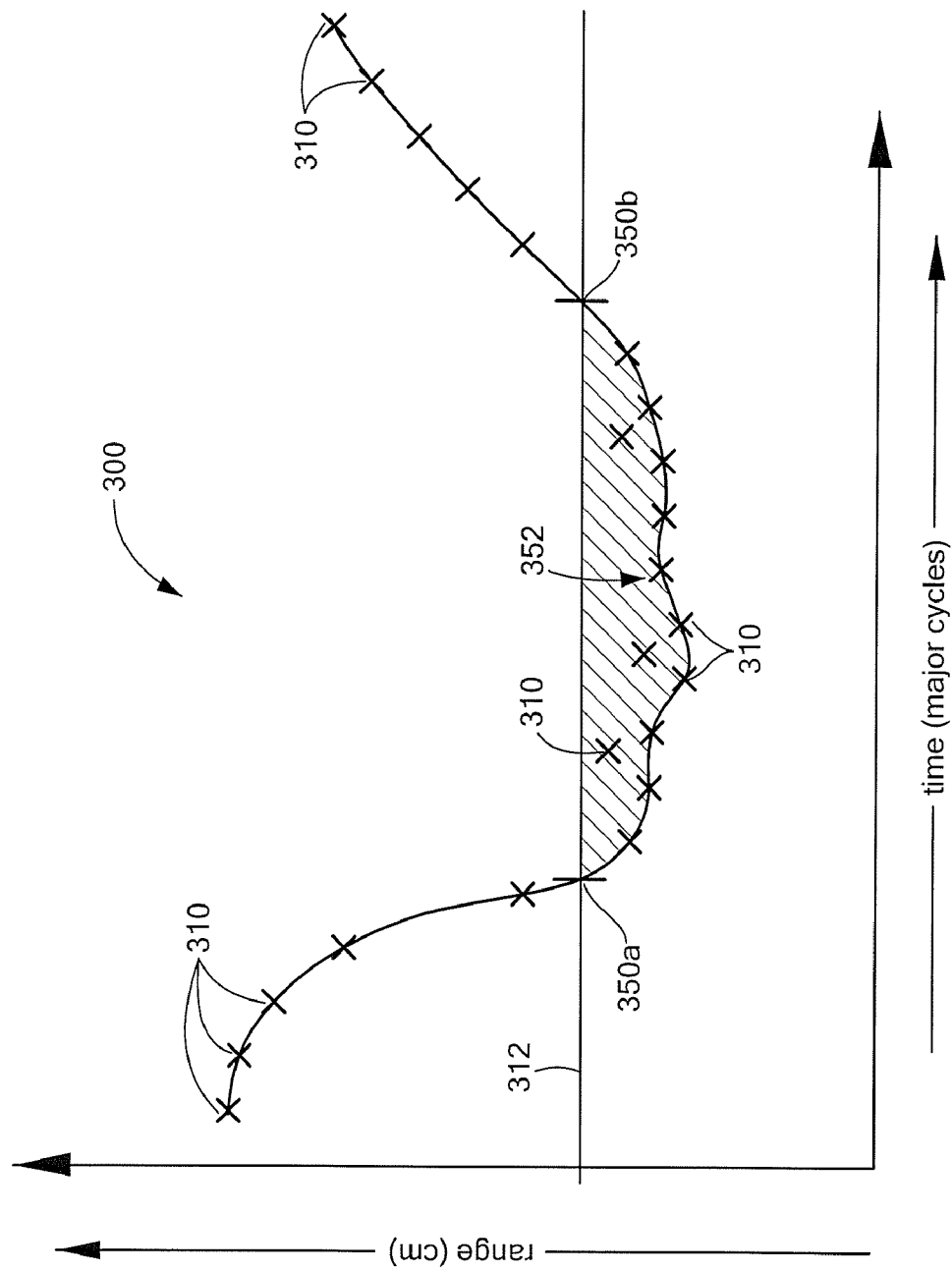
FIG. 7 is a plot of radial range v. time.

It will be appreciated by those of ordinary skill in the art that unless otherwise indicated herein, the particular sequence described in FIG. 7 (and elsewhere herein) is illustrative only and can be varied without departing from the spirit of the concepts described and claimed herein.

Turning now to FIG. 6, processing begins in decision block 230 which implements a loop in which the system simply waits for a target to enter a virtual detection zone. Once a target enters the virtual detection zone, then processing proceeds to processing block 232 where information is accumulated on the target. Such information includes but is not limited to statistics related to the target including but not limited to target range history, angle history, speed, time in virtual detection zone, and detection density as a function of range and angle. Information is accumulated on the target as long as the target remains in the virtual detection zone.

Once the target leaves the virtual detection zone, processing then proceeds to decision block 234 in which a decision is made as to whether a missed alert signal should be generated. Such a decision is made by utilizing the information and statistics accumulated on the target while the target is in the virtual detection zone. In one embodiment, one or more logical conditions (sometimes referred to as "missed alert signal logic") are applied to the information to make the decision.

In one embodiment, the following set of eleven logical conditions are used.

Condition 1 (alertFlag is not set) requires that the SOD has not generated a BSA signal.

Condition 2 (alertVDuration is from 45 to 750 mc) requires that a target be in the virtual detection zone for a predetermined amount of time. In one embodiment, the time is selected to be in the range of 45 major cycle to 750 major cycles where 125 major cycles equals 1 second.

Condition 3 (rangeClosetApproach is from 40 to 280 cm) requires that a target be within a predetermined distance of the SOD. In one embodiment, the predetermined distance is selected to be in the range of 40 to 280 cm.

Condition 4 (Bm4 detections are more than 45% of total detection) requires that the number of detections in one or more particular beams be a percentage of a total number of detections. In one embodiment, beam 4 detections are more than 45% of the total number of detections.

Condition 5 (there are more than 5 bm4 detections) requires that a minimum number of detections occur in one or more particular beams. In one embodiment, there must be at least five detections in beam 4.

Condition 6 (Detect bm4 in more than 15% of total mc of alertVDuration) requires that a percentage of a total number of detections in a VDZ occur in a predetermined one or more beams. In one embodiment, 15% of the total detections in a VDZ must occur in beam 4 in a given number of major cycles.

Condition 7 (areaVrangeLongSmooth8 is less than 90% of areaVlowestDetInLastSecond) is an indirect way to determine sensor detection density. In the case where a blockage condition exists, the density of detections will be reduced relative to the density during normal operation yielding a ratio of less than 90%. In one embodiment, the closest detection in range within the previous 1 second (i.e. 125 major cycles) is identified and a curve (denoted the "lowestDetectionInLastSecond" line) is generated from a series of such points. Then, a region defined by a boundary defined by the lowestDetectionInLastSecond" line and a line which denotes the virtual detection zone line is identified. Once the region is identified, the mathematical area of this region denoted (areaVLowestDetectionInLastSecond) is computed. Next the condition 7 requires that the closest detection in range smoothed over the previous 8 major cycles is identified and a curve (denoted the "rangeLongSmooth8" line) is generated. Then, a region defined by a boundary defined by the rangeLongSmooth8" line and the line which denotes the virtual detection zone line is identified. Once the region is identified, the mathematical area of this region denoted (area rangeLongSmooth8) is computed. Once the areas are known, condition 7 requires that areaVrangeLongSmooth8 be less than 90% of areaVlowestDetInLastSecond.

Condition 8 (Last alertV is more than 250 mc ago) requires that last missed alert signal have been generated a predetermined amount of time in the past. In one embodiment, the last missed alert signal must have been generated more than 250 major cycles ago.

Condition 9 (bm5Elimination flag was not set) requires that no more than a predetermined number of detections occur on one or more predetermined beams. In one embodiment, no more than 20 detections may have occurred in beam 5 in the 40 cm-1000 cm range and between the fifth and fifty-fifth major cycle.

Condition 10 (bm12 is less than 5) requires that no more than a predetermined number of detections occur on one or more predetermined beams within a predetermined amount of time. In one embodiment, less than five detections of beam 1 or beam 2 are allowed in the first 25 major cycles.

Condition 11 (Vehicle speed is greater than 30 km/hour) requires that the host vehicle speed be greater than a threshold value. In one embodiment, the host vehicle speed is greater than 30 km/hour.

It should, of course, be appreciated that other different logical conditions may also be used. The particular logical conditions to use in an application depend upon a variety of factors. For example, sensor characteristics such as the number of beams, beamwidths, beamshapes, beam overlap must be considered. If in decision block 234 a decision is made that a missed alert signal should not be generated, then processing returns to decision block 230 where the process again waits for a target (e.g. a vehicle such as vehicle 18 in FIG. 1) to enter the virtual detection zone.

If a decision is made in decision block 234 that an alert was missed, then processing flows to processing block 236 where the time of the miss is recorded.

Processing then proceeds to decision block 240 where a determination is made as to whether a blockage condition exists. In one embodiment, such a determination is made by evaluating a pattern of missed alert signals. For example, one or more logical conditions may be used (sometimes referred to as "blockage alert signal logic"). In one embodiment, a logical condition is used in which if a predetermined number of missed alert signals (e.g. "M" missed alert signals or more simply "M misses") are generated within a predetermined period of time (e.g. N minutes), then a blockage condition is declared to exist. It should be appreciated that the blockage alert signal logic may include multiple logical conditions. For example, a sliding scale of misses to time spent in a virtual detection zone may be used (e.g. 2 misses in 10 minutes or 4 misses in 20 minutes or 5 misses in 40 minutes). It should also be appreciated that a missed alert signal is generated only when a BSA signal has not been generated. Stated differently, in a preferred embodiment, whenever a BSA signal is generated for a given target, it is not necessary to generate a missed alert signal for that target.

If a decision is made in block 240 that a blockage condition does not exist (e.g. M misses have not occurred within N minutes), then processing returns to decision block 230 where the system waits for a target to enter a virtual detection zone.

If on the other hand, a decision is made in decision block 240 that a blockage condition exists, then processing flows to processing block 242 where a blockage alert signal is provided. The blockage alert signal may be used to provide an indication (e.g. to a user of a vehicle) that a blockage condition exists in a sensor (e.g. SOD 14, 15). Processing then returns to decision block 230 where the system waits for a target to enter a virtual detection zone.

Once a blockage alert signal is generated if, at a later time, it does not appear that the blockage condition still exists (e.g. the system does not generate any new missed alert signals or the system generates one or more detection signals which indicate that the system is working), then the blockage alert signal is allowed to expire (i.e. a determination is made that system is no longer blocked). However, the system continues to monitor for blockage and if the system continues to look like a blockage condition exists (e.g. the system does generate new missed alert signals), then blockage alert signal does not expire.

Referring now to FIG. 7, a plot 300 of radial range vs. number of major cycles includes a plurality of sensor detections denoted 310. It should be appreciated that line 312 at 350 cm represents the virtual detection zone (i.e. the plot of FIG. 7 corresponds to a virtual detection zone having an arc shape (e.g. as shown by VDZ 25 in FIG. 1-3) with a radius of 350 cm. Reference numeral 350a denotes the point at which an object enters a virtual detection zone (e.g. processing block 230 in FIG. 6) and reference numeral 350b denotes the point at which the object exits the virtual detection zone (e.g. processing block 234 in FIG. 6). Cross-hatched area 352 corresponds to the region in which statistics on the target are collected (e.g. processing block 232 in FIG. 6).

Figure 8:
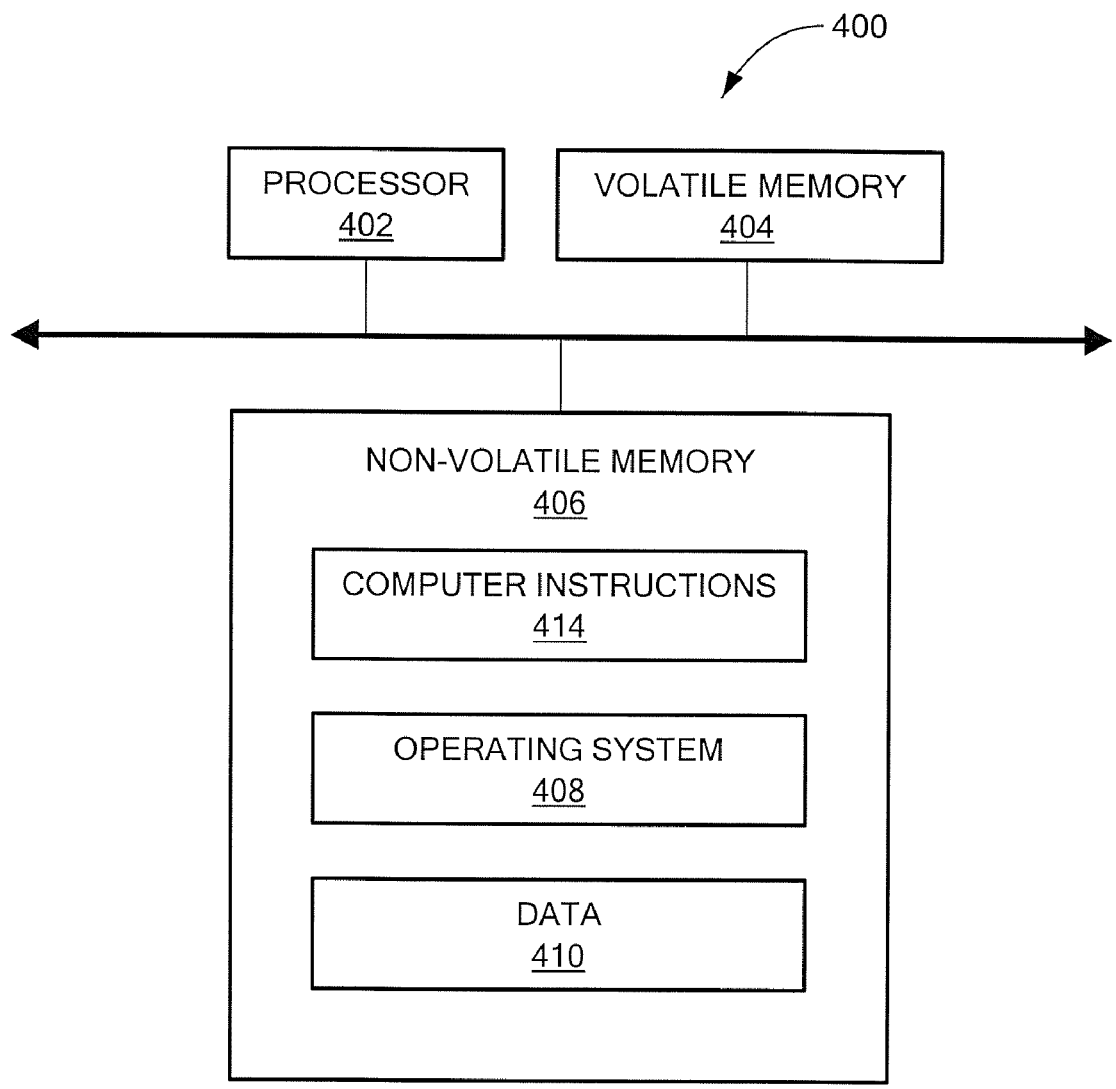
FIG. 8 is a block diagram of a processing system capable of performing blockage detection processing.

Referring to FIG. 8, a computer 400 which includes a processor 402 and a volatile memory 404, a non-volatile memory 406 (e.g., a flash memory). Non-volatile memory 406 stores operating system 408 and data 410. Non-volatile memory 406 also stores computer instructions 412, which are executed by processor 402 out of the volatile memory 404 to perform all or part of processes described above in conjunction with FIGS. 1-7.

It should be appreciated that all or part of processes described above in conjunction with FIGS. 1-7 are not limited to use with the hardware and software of FIG. 12; it may find applicability in any computing or processing environment and with any type of machine that is capable of running a computer program. All or part of the processes described above in conjunction with FIGS. 1-7 may be implemented in hardware, software, or a combination of the two. All or part of the processes described above in conjunction with FIGS. 1-7 may be implemented in computer programs executed on programmable computers/machines that each includes a processor, a storage medium or other article of manufacture that is readable by the processor (including volatile and non-volatile memory and/or storage elements). Program code may be applied to data entered using an input device to perform All or part of the processes described above in conjunction with FIGS. 1-7 and to generate output information.

The system may be implemented, at least in part, via a computer program product (i.e., a computer program tangibly embodied in an information carrier (e.g., in a machine-readable storage device or in a propagated signal, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform all or part of the processes described above in conjunction with FIGS. 1-7. All or part of the processes described above in conjunction with FIGS. 1-7 may also be implemented as a machine-readable storage medium, configured with a computer program, where upon execution, instructions in the computer program cause the computer to operate in accordance with all or part of the processes described above in conjunction with FIGS. 1-7.

Having described preferred embodiments which serve to illustrate various concepts, structures and techniques which are the subject of this patent, it will now become apparent to those of ordinary skill in the art that other embodiments incorporating these concepts, structures and techniques may be used.

For example, the information related to the target and which is used to determine whether a missed alert signal should be generated is listed herein as including, but not limited to one or more of target range history, range of closest approach, point of closest approach, angle, angle history, speed, time spent by a target in a virtual detection zone, number of total detections, raw radar detection count and detection density as a function of range and/or angle. It should be appreciated, however, that the particular information used to determine whether a missed alert signal should be generated depends upon a variety of factors related to the sensor with which the technique described herein is being used. For example, it may be desirable or even necessary to use different information if the sensor has a different number of beams or different beam widths or different beam overlaps, etc. . . . After reading the description provided herein, those of ordinary skill in the art will appreciate how to select the necessary information need to determine whether a missed alert signal should be generated. Similarly, the selection of the necessary logic to apply determine whether a blockage condition exists depends upon a variety of factors related to the sensor and after reading the description provided herein, those of ordinary skill in the art will appreciate how to select such logic.

Accordingly, it is submitted that that scope of the patent should not be limited to the described embodiments but rather should be limited only by the spirit and scope of the following claims.

What is claimed is:
1. A blockage detection system comprising:
a missed alert detection processor configured to receive target data generated in a virtual detection zone of the blockage detection system, and in response to the target data to generate a missed alert signal; and
a blockage detection determination processor coupled to receive a missed alert signal from said missed alert detection processor and configured to provide a blockage alert signal at an output port thereof.
2. The blockage detection processor of claim 1 wherein said missed alert detection processor comprises:

a virtual detection zone processor configured to determine when a target detection occurs in the virtual detection zone;

an accumulator for collecting information related to the object, said accumulator responsive to a signal from said virtual zone detection processor indicating that an object is within the virtual detection zone; and a missed alert signal generator coupled to receive information from said accumulator, said missed alert signal generator configured to analyze information from said accumulator and to provide a missed alert signal in response to a metric being met.

3. The blockage detection processor of claim 2 wherein said accumulator collects one or more of:
(1) target range;
(2) target range history;
(3) range of closest approach;
(4) point of closest approach;
(5) angle;
(6) angle history;
(7) speed;
(8) time spent by a target in a virtual detection zone;
(9) number of total detections;
(10) raw radar detection count; and
(11) detection density as a function of range and/or angle.

4. The blockage detection processor of claim 3 wherein said a blockage detection determination processor provides a blockage alert signal in response to receiving M missed alert signals from said missed alert detection processor within N amount of time.

* * * * *